(12) United States Patent
Keeney et al.

(10) Patent No.: US 9,327,731 B2
(45) Date of Patent: May 3, 2016

(54) METHOD OF CONTROLLING A BRAKE SYSTEM FOR A VEHICLE

(75) Inventors: Christopher Keeney, Troy, MI (US); Jeff Lloyd, Naperville, IL (US)

(73) Assignee: ArvinMeritor Technology, LLC, Troy, MI (US)

( * ) Notice: Subject to any disclaimer, the term of this patent is extended or adjusted under 35 U.S.C. 154(b) by 1118 days.

(21) Appl. No.: 13/365,537

(22) Filed: Feb. 3, 2012

(65) Prior Publication Data

US 2013/0204501 A1 Aug. 8, 2013

(51) Int. Cl.
*B60T 8/172* (2006.01)
*B60W 30/18* (2012.01)
*B60T 1/10* (2006.01)

(52) U.S. Cl.
CPC ............ *B60W 30/18127* (2013.01); *B60T 1/10* (2013.01); *B60T 2201/02* (2013.01); *B60T 2270/604* (2013.01)

(58) Field of Classification Search
CPC . B60T 1/10; B60T 2201/02; B60T 2270/604; B60W 30/18127
See application file for complete search history.

(56) References Cited

U.S. PATENT DOCUMENTS

| | | | |
|---|---|---|---|
| 5,130,928 A | 7/1992 | Petersen | |
| 5,615,933 A * | 4/1997 | Kidston et al. | 303/152 |
| 7,281,770 B1 * | 10/2007 | Curran | B60L 7/18 303/151 |
| 8,055,422 B2 | 11/2011 | Yurgil | |
| 8,465,107 B2 | 6/2013 | Lloyd | |
| 2003/0184152 A1 * | 10/2003 | Cikanek | B60K 6/48 303/152 |
| 2007/0192010 A1 * | 8/2007 | Carlstrom | B60T 1/10 701/70 |
| 2008/0176705 A1 * | 7/2008 | Tamai et al. | 477/3 |
| 2009/0118886 A1 * | 5/2009 | Tamai et al. | 701/22 |
| 2009/0145673 A1 | 6/2009 | Soliman et al. | |
| 2010/0084211 A1 * | 4/2010 | Seidel et al. | 180/294 |
| 2010/0219681 A1 * | 9/2010 | Rini | B60K 6/12 303/152 |
| 2011/0060487 A1 * | 3/2011 | Jess et al. | 701/22 |
| 2011/0130937 A1 | 6/2011 | Krueger et al. | |
| 2011/0276245 A1 | 11/2011 | Krueger et al. | |
| 2011/0282558 A1 | 11/2011 | Park | |
| 2012/0207620 A1 * | 8/2012 | Dalum et al. | 417/44.1 |
| 2012/0319463 A1 * | 12/2012 | Lloyd | B60T 1/10 303/3 |
| 2012/0319464 A1 * | 12/2012 | Lloyd | B60T 1/10 303/3 |
| 2013/0066493 A1 * | 3/2013 | Martin | B60W 30/18136 701/22 |
| 2013/0146374 A1 * | 6/2013 | Books | B60T 1/10 180/65.21 |
| 2013/0288855 A1 * | 10/2013 | Monsere | B60L 15/2045 477/24 |
| 2013/0345913 A1 * | 12/2013 | Krueger | B60T 1/10 701/22 |

FOREIGN PATENT DOCUMENTS

CN 102026855 A 4/2011

OTHER PUBLICATIONS

Chinese Patent and Trademark Office, Office Action for the corresponding Chinese Patent Application No. 201210576776.9 mailed Sep. 28, 2014.
European Patent Office, Extended European Search Report for corresponding EP 13153025.5 mailed May 17, 2013.

* cited by examiner

*Primary Examiner* — Mussa A Shaawat
(74) *Attorney, Agent, or Firm* — Brooks Kushman P.C.

(57) ABSTRACT

A method of controlling a brake system for a vehicle. A foundation brake may be applied to provide a foundation brake torque. Vehicle speed data, vehicle inclination data, and foundation brake pressure data may be obtained. A foundation brake torque profile may be determined that includes a set of vehicle speed values, a set of foundation brake pressure values, and a set of foundation brake torque values.

20 Claims, 2 Drawing Sheets

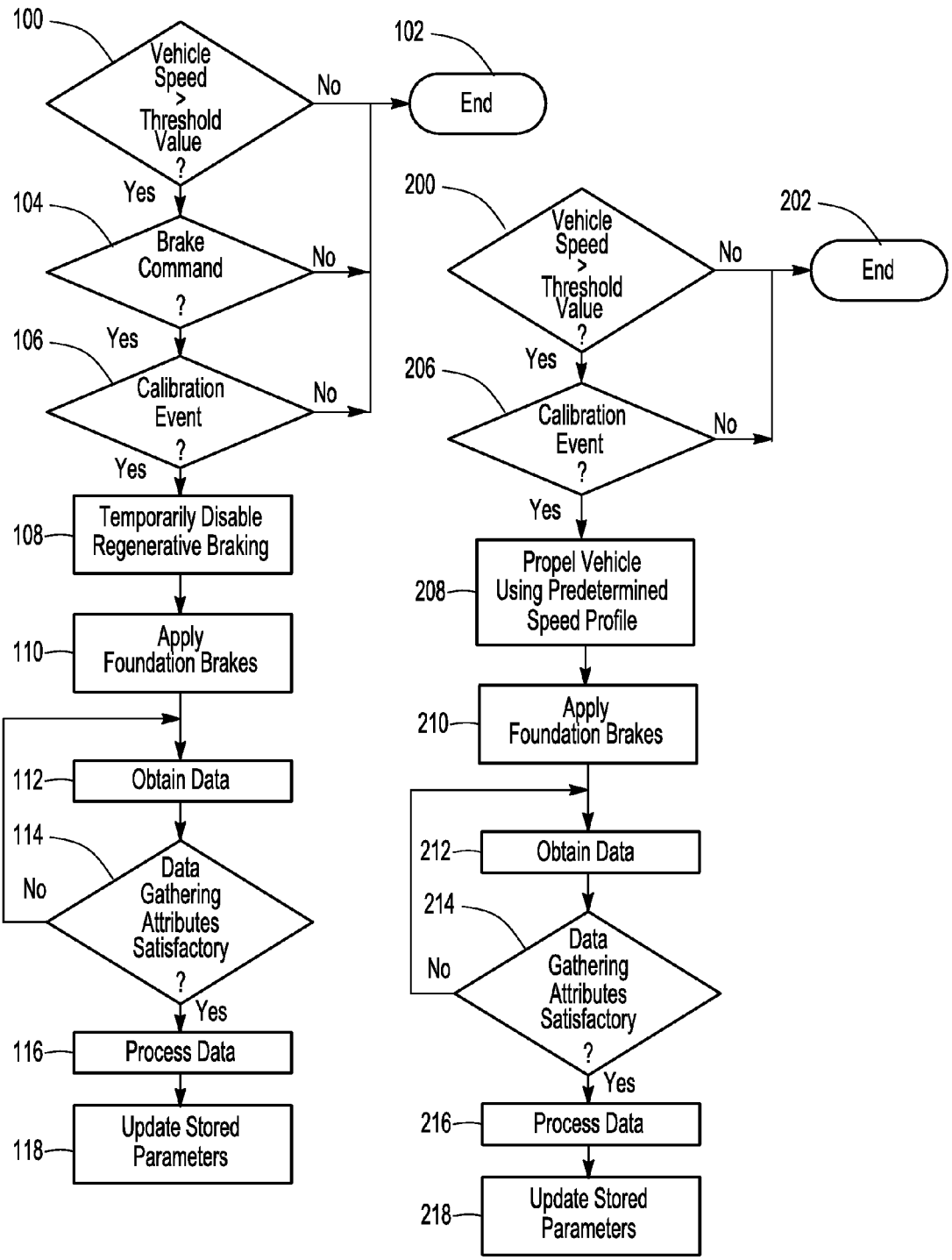

METHOD OF CONTROLLING A BRAKE SYSTEM FOR A VEHICLE

TECHNICAL FIELD

The present application relates to a method of controlling a brake system for a vehicle.

BACKGROUND

A method of controlling a deceleration rate of a hybrid electric vehicle is disclosed in U.S. Pat. No. 8,055,422.

SUMMARY

In at least one embodiment, a method of controlling a brake system for a vehicle is provided. The method may include temporarily disabling braking of the vehicle with a regenerative braking system while permitting braking with the foundation brake. A foundation brake may be applied to provide a foundation brake torque. Vehicle speed data, vehicle inclination data, and foundation brake pressure data may be obtained while the foundation brake is applied. A foundation brake torque profile may be determined that includes a set of vehicle speed values, a set of foundation brake pressure values, and a set of foundation brake torque values. The set of foundation brake torque values may be based at least in part on the set of vehicle speed values and the vehicle inclination data.

In at least one embodiment, a method of controlling a brake system for a vehicle is provided. The method may include propelling the vehicle with a predetermined speed profile. A foundation brake may be applied to provide a foundation brake torque. Torque may be provided with an electrical machine to maintain the predetermined speed profile. Vehicle speed data, vehicle inclination data, electrical machine current data, and foundation brake pressure data may be obtained while the foundation brake is applied. A foundation brake torque profile may be determined that includes a set of vehicle speed values, a set of foundation brake pressure values, and a set of foundation brake torque values. The set of foundation brake torque values may be based at least in part on the set of vehicle speed values and the vehicle inclination data.

In at least one embodiment, a method of controlling a brake system for a vehicle is provided. The method may include determining whether a vehicle speed exceeds a threshold speed value and determining whether a calibration event exists. Braking of the vehicle with a regenerative braking system may be temporarily disabled or the vehicle may be propelled with a predetermined speed profile when the vehicle speed exceeds a threshold speed value and the calibration event exists. A foundation brake may be applied to provide a foundation brake torque. Vehicle speed data, vehicle inclination data, and foundation brake pressure data may be obtained. A foundation brake torque profile may be determined that includes a set of vehicle speed values, a set of foundation brake pressure values, and a set of foundation brake torque values. Each member of the set of foundation brake pressure values and each member of the set of foundation brake torque values may be associated with a corresponding member of the set of vehicle speed values. The set of foundation brake torque values may be based on the set of vehicle speed values, mass of the vehicle, and the vehicle inclination data.

BRIEF DESCRIPTION OF THE DRAWINGS

FIG. 2 is a flowchart of an embodiment of a method of controlling a brake system.

FIG. 3 is a flowchart of another embodiment of a method of controlling a brake system.

DETAILED DESCRIPTION

Figure 1:
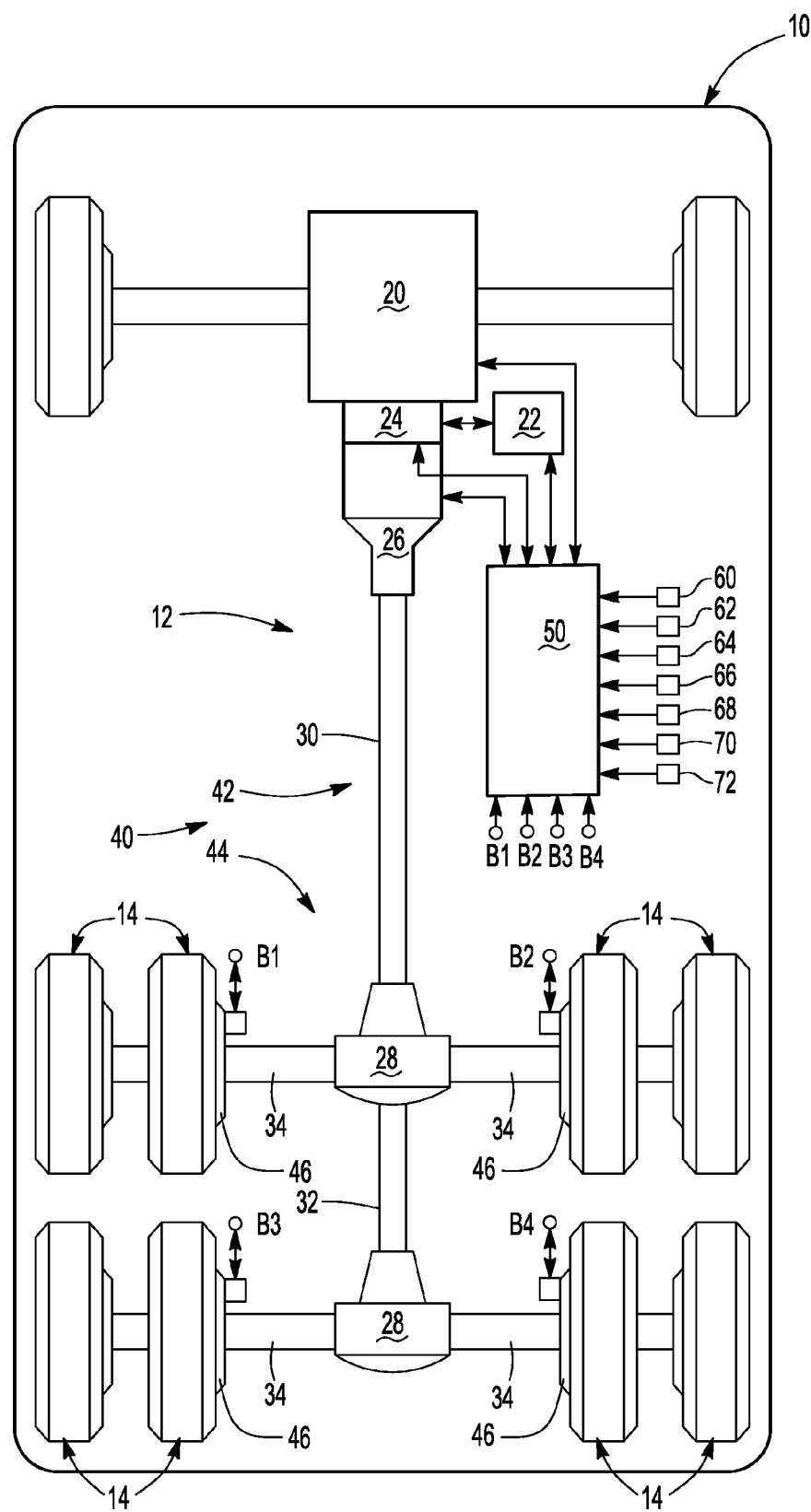
FIG. 1 is a schematic of an exemplary vehicle having a brake system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels. The vehicle 10 may include a trailer for transporting cargo in one or more embodiments.

The vehicle 10 may be configured as a hybrid vehicle that may have a plurality of power sources that may be used to propel the vehicle 10. As such, the vehicle 10 may have a hybrid drivetrain 12 that may provide torque to one or more traction wheel assemblies 14. In at least one embodiment, the drivetrain 12 may include a first power source 20, a second power source 22, an electrical machine 24, a power transfer unit 26, and one or more axle assemblies 28.

The first and second power sources 20, 22 may provide power that may be used to rotate one or more traction wheel assemblies 14. In at least one embodiment, the first power source 20 may be configured as an internal combustion engine that may be adapted to combust any suitable type of fuel, such as gasoline, diesel fuel, or hydrogen. The second power source 22 may be configured as an electrical power source, such as a battery, capacitor, or fuel cell.

The first and second power sources 20, 22 may be coupled to or may be configured to drive the electrical machine 24. The electrical machine 24 may be of any suitable type, such as a motor or motor-generator. The first and second power sources 20, 22 may independently or simultaneously provide power to the electrical machine 24 in one or more embodiments.

The power transfer unit 26 may be coupled to or may be driven by the electrical machine 24. The power transfer unit 26 may be of any suitable type, such as a multi-gear "step ratio" transmission or an electronic converterless transmission as is known by those skilled in the art.

The axle assembly 28 may be coupled to one or more traction wheel assemblies 14. In FIG. 1, a tandem axle configuration is shown that includes two axle assemblies 28. The axle assembly 28 disposed closest to the front of the vehicle 10 or the top of FIG. 1 may be referred to as a forward-rear axle assembly while the other axle assembly 28 may be referred to as a rear-rear axle assembly. Optionally, additional axle assemblies may be provided that may be coupled together in series. An output of the power transfer unit 26 may be coupled to an input of the forward-rear axle assembly 28 with a drive shaft 30. An output of the forward-rear axle assembly 28 may be selectively coupled to an input of the rear-rear axle assembly 28, if provided, via a drive shaft 32. In addition, each axle assembly 28 may each have at least one output that may be coupled to a traction wheel assembly 14. For example, each axle assembly 28 may be selectively or non-selectively coupled to a corresponding wheel axle 34 or half-shaft upon which one or more traction wheel assemblies 14 may be disposed.

The vehicle 10 may also include a brake system 40. The brake system 40 may include a regenerative braking system 42 and a foundation braking system 44.

The regenerative braking system 42 may capture kinetic energy when used to brake or slow the velocity of the vehicle 10. Recovered energy may be transmitted along the drivetrain 12 from the vehicle traction wheel assemblies 14 to drive the electrical machine 24 and may be used to charge the second power source 22 in one or more embodiments.

The foundation braking system 44 may include one or more friction or foundation brakes 46. A foundation brake 46 may be disposed proximate a traction wheel assembly 14 or wheel axle 34. The foundation brake 46 may have any suitable configuration, such as a drum brake or disc brake.

One or more controllers or control modules 50 may be provided to monitor and control various components and systems of the vehicle 10. For example, the control module 50 may be electrically connected to or communicate with components of the drivetrain 12, such as the first power source 20, second power source 22, electrical machine 24, and power transfer unit 26 to monitor and control their operation and performance. The control module 50 may also monitor and control the brake system 40 as will be discussed in more detail below. In addition, the control module 50 may also process input signals or data from various input devices or sensors. These input devices may include a vehicle speed sensor 60, a brake pedal sensor 62, one or more brake pressure sensors 64, an inclinometer 66, a trailer detection sensor 68, one or more air spring pressure sensors 70, and an operator communication device 72.

The vehicle speed sensor 60 may be provided to detect the speed of the vehicle 10. The vehicle speed sensor 60 may be of any suitable type as is known by those skilled in the art.

A brake pedal sensor 62 may be provided to detect a braking input command that may be provided by a vehicle driver or operator. For example, the brake pedal sensor 62 may detect the position of a brake pedal or the position or operating state of a component that is connected to or operated by a brake pedal, such as a treadle valve that may modulate a control air pressure that is provided to a relay valve that may control the supply of air to one or more brake actuators. The detected position of the brake pedal may be used to control the brake torque provided by the brake system 40. Brake torque may be provided by the regenerative braking system 42 and/or the foundation braking system 44. In the case of the foundation braking system 44, the control module 50 may control operation of a valve that controls fluid pressure provided to a foundation brake 46. Fluid pressure output may be proportional to a detected angle of motion or degree of actuation of the brake pedal.

A brake pressure sensor 64 may be provided to detect fluid pressure that is provided to control or actuate a foundation brake 46. For example, a pressurized fluid such as compressed air or hydraulic fluid may be used to actuate the foundation brake 46. For simplicity, one brake pressure sensor 64 is shown in FIG. 1.

An inclinometer 66 may be provided for detecting, measuring, and/or determining an angle of slope or inclination of the vehicle 10. Such measurements may be indicative of a road grade or slope of a surface upon which the vehicle 10 is disposed. The inclinometer 66 may include or may be based on elevation data provided by a global positioning system (GPS) and/or data provided by an on-vehicle inclinometer sensor. In at least one embodiment, the inclinometer 66 may provide data indicative of the number of degrees at which the vehicle 10 is inclined or declined with respect to an artificial horizon.

A trailer detection sensor 68 may be provided to detect whether a trailer is mounted to the vehicle 10. The trailer detection sensor 68 may also detect or provide data that identifies individual trailers. As such, data from the trailer detection sensor 68 may be used to determine when a different trailer is coupled to the vehicle 10 based on a change in the trailer identification data.

The air spring pressure sensors 70 may be provided as part of a suspension system of the vehicle 10. An air spring pressure sensor 70 may detect the pressure of a pressurized fluid, such as compressed air, that is provided to an air spring that may be part of the vehicle suspension system. Data from the air spring pressure sensors 70 may be used to detect the weight of the vehicle 10 or a portion of the vehicle 10, such as a trailer.

The operator communication device 72 may be provided to receive an input from an operator. The operator communication device 72 may be of any suitable type or types, such as a switch, button, sensor, display, touchscreen or the like. The operator communication device 72 may be used to input data that may not be predetermined or provided by a sensor, such as may be the case when a vehicle 10 is not equipped with one or more of the sensors previously discussed. For example, the operator communication device 72 may facilitate entry of information regarding the identification of a trailer, vehicle weight, and whether servicing of vehicle components, such as foundation brake 46, has been performed. In addition, the operator communication device 72 may allow the operator to activate or set a vehicle cruise control system, which may be associated with or controlled using the control module 50.

The control module 50 may also monitor and control the brake system 40. For example, the control module 50 may monitor and control the amount of brake torque provided by the regenerative braking system 42 and foundation braking system 44. Such control may include blending the amount of brake torque provided by the regenerative and foundation braking systems 42, 44 so that no noticeable transition between regenerative and foundation braking is detected by a vehicle operator. A reasonably accurate estimate of the foundation brake torque may be used to provide smooth blending and/or adequate braking performance. The foundation brake torque may vary due to a number of factors, such as foundation brake type, brake pad material, brake size, and brake condition (e.g., new or burnished brake pads or distortion due to severe braking events). A foundation brake torque profile may be developed and updated to account for these factors, thereby providing an estimate of foundation brake torque that may reflect actual foundation brake performance. Communication between the control module 50 and the foundation braking system 44 is represented by connection nodes B1, B2, B3, and B4 in FIG. 1.

A foundation brake torque profile may be based on forces that may act on the vehicle 10 when in motion. These forces include aerodynamic drag ($F_{aero}$), rolling resistance ($F_{roll}$), grade resistance ($F_{grade}$), and brake force ($F_{brake}$). Brake force may be based on contributions by the regenerative braking system 42 and/or foundation braking system 44. If regenerative braking is not applied, then brake force may be due to operation of the foundation braking system 44 alone. If regenerative braking is applied, then the brake force contribution made by the regenerative braking system 42 may be based on data that may be indicative of the torque provided by the regenerative braking system 42. Such data may be predetermined and may be based on performance characteristics or the duty cycle of the electrical machine 24.

Brake force ($F_{brake}$) may be determined by the following relationship:

$$F_{brake} = m*a - F_{aero} - F_{roll} - F_{grade}$$

where:
m=vehicle mass
a=vehicle acceleration
$F_{aero}$=aerodynamic drag;
$F_{roll}$=rolling resistance; and
$F_{grade}$=grade resistance Vehicle mass may include the mass of a truck or tractor portion of the vehicle 10 and mass of a trailer coupled to tractor. Vehicle mass may be a predetermined value, entered by an operator and/or may be based at least in part on data from air spring pressure sensors 70. For example, the mass of the tractor portion of the vehicle 10 may be predetermined and the mass of the trailer may be based on data from an air spring pressure sensor 70 in one or more embodiments.

Vehicle acceleration may be based on vehicle speed data, such as by integrating the change in vehicle speed or velocity over time.

Aerodynamic drag may be the drag force exerted by air on the vehicle 10. Aerodynamic drag may be a predetermined value based on vehicle testing or may be calculated based on the change in vehicle speed over time, such as during a vehicle coast down event in which the brake system 40 may not be actuated to slow the vehicle 10.

Rolling resistance may be due to the road surface and other frictional effects. Rolling resistance may be a predetermined value, a predetermined function based on tire pressure, or may also be calculated similar to or in conjunction with aerodynamic drag.

Grade resistance may be due to gravitational forces and road slope. Grade resistance may be calculated based on inclinometer data or data indicative of vehicle elevation change, such as GPS data. Grade resistance may be zero on a flat surface, and may have a positive or negative sign, depending on whether the vehicle 10 is on and uphill or downhill slope.

Brake force ($F_{brake}$) may be used to calculate brake torque ($T_{brake}$) as shown by the following relationship:

$$T_{brake} = F_{brake} * r_{tire}$$

where:
$F_{brake}$=brake force; and
$r_{tire}$=tire radius

Tire radius may be a predetermined value based on tire pressure and/or the tire size installed on the vehicle 10, which may be designated by the vehicle manufacturer and/or may be entered by an operator. Such data may be stored in memory of the control system 50.

Referring to FIGS. 2 and 3, flowcharts of exemplary methods of controlling a vehicle brake system 40 are shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the spirit or scope of the present invention.

In at least one embodiment, a method may be executed by the control module 50 and may be implemented as a closed loop control system. Moreover, the method may be enabled or disabled based the operating state of the vehicle 10.

Referring to FIG. 2, a first method of controlling a vehicle brake system 40 is shown.

At block 100, the method may begin by determining whether the speed of the vehicle 10 exceeds a threshold speed value. This step may perform two functions. First, this step may determine whether the vehicle 10 is in motion. Second, this step may determine whether the vehicle 10 is moving at a speed at which acceptable data may be obtained. Vehicle speed may be provided by the vehicle speed sensor 60. The threshold speed value may be a predetermined value and may be based on vehicle development testing. In at least one embodiment, the threshold speed value may be at least 10 miles per hour (16.1 km/h). If the vehicle speed does not exceed the threshold speed value, then the method may end at block 102. If the vehicle speed exceeds the threshold speed value, then the method may continue at block 104.

At block 104, the method may determine whether a brake command is requested. A brake command may be requested when the brake pedal is actuated. Brake pedal actuation may be detected by the brake pedal sensor 62. If a brake command is not requested, then the method may end at block 102. If a brake command is requested, then the method may continue at block 106.

At block 106, the method may determine if a calibration event or calibration condition exists. A calibration event may exist in various situations, such as when a different truck trailer is coupled to the vehicle, a change in weight of the vehicle 10 exceeds a predetermined weight threshold value, a predetermined number of brake commands have occurred since the last calibration event, when maintenance has been performed on the foundation brake (e.g., brake pad or brake component replacement), when a predetermined maintenance interval has elapsed, and when a predetermined amount of time has elapsed since a previous calibration event. If a calibration event does not exist, then the method may end at block 102. If a calibration event exists, then the method may continue at block 108.

At block 108, regenerative braking may be temporarily disabled. Regenerative braking may be disabled by inhibiting energy recovery or operation of the electrical machine 24 as a generator that is powered by rotation of a traction wheel assembly 14.

At block 110, the foundation brakes 46 may be applied. The foundation brake 46 may be applied at a force that is based on operator input or at a predetermined foundation brake pressure.

At block 112, data may be obtained or gathered while a foundation brake 46 is applied. The data that may be gathered may include vehicle speed data, foundation brake pressure data, and optionally vehicle inclination data. Such data may be sampled over time. The sampled data may be used to develop a set of vehicle speed values and a set of foundation brake pressure values. For instance, a vehicle speed value and a foundation brake pressure value may be sampled or associated with different discrete time values and compiled to populate each set.

At block 114, the method may determine whether data gathering attributes or data gathering conditions are satisfactory. Data gathering attributes may be satisfactory when the vehicle speed continues to exceed the threshold speed value, braking is commanded, and rapid brake pedal operation or rapid changes in brake pedal position are not detected. Rapid brake pedal operation may be based predetermined attributes, such as a predetermined rate of change between actuation and release of the brake pedal. If data gathering attributes are satisfactory, then the method may return to block 112 to continue to obtain data. If data gathering attributes are not satisfactory, then the method may continue at block 116.

At block 116, the data may be processed. Data processing may include filtering the data to ignore data obtained over a predetermined period of time. For example, data may be ignored during the first 0.5 to 1.0 seconds after initial actuation of the brake pedal to effectively filter out or ignore data that may be obtained before the foundation braking system 44 settles into steady-state braking or component actuation characteristics stabilize. Data processing may also include calculating a set of foundation brake torque values. Such calculations may employ the formulas previously discussed. In addition, statistical algorithms may be employed to determine a brake torque versus brake pressure profile. For example, statistical analysis, such as least-squares fitting may be applied to the set of foundation brake torque values to provide a best fit line indicative of expected foundation brake torque at different brake pressure values. In addition, processing of data may include an assessment or comparison to existing foundation brake torque data. For example, an assessment or comparison can be made to determine whether the processed data has significantly changed from previous or existing data associated with the current foundation brake torque profile. A significant change may be determined using predetermined parameters. For instance, a predetermined deviation amount or tolerance range may be used for assessment purposes. As such, a significant change may exist when the processed data differs from the existing data by more than a predetermined deviation amount. If there is a significant change, the method may not continue at block 118. If there is not a significant change, then the method may end or not continue at block 118.

At block 118, the processed data may be used to update stored parameters for use in future braking events. For example, the processed data may be used to update a lookup table that may store the foundation brake torque profile. The foundation brake torque profile may include three dimensions of data, such as foundation brake torque data, foundation brake pressure data, and vehicle speed data. Foundation brake torque data may be calculated as previously described and stored such that the foundation brake torque data or best fit line data is associated with corresponding brake pressure data value and/or vehicle speed data. As such, an estimate of foundation brake torque may be available for use in controlling future braking events and estimating the foundation brake torque that will be available at various brake system operating conditions.

Referring to FIG. 3, another method of controlling a vehicle brake system 40 is provided. In this embodiment, regenerative braking may not be disabled. In addition, this method may be suited for repeated execution by a technician as part of a vehicle maintenance program to provide more comprehensive data at a wider range of foundation brake pressures and/or vehicle speeds. As such, the method may be initiated in response to a command input by a technician or operator, such as a command provided via an operator communication device 72. For brevity, the flowchart in FIG. 3 presumes that execution of the method is desired and therefore does not show input of a command to initiate execution of the method.

At block 200, the method may begin by determining whether the speed of the vehicle 10 exceeds a threshold speed value, similar to block 100 described above. If the vehicle speed does not exceed the threshold speed value, then the method may end at block 202. If the vehicle speed exceeds the threshold speed value, then the method may continue at block 206.

At block 206, the method may determine whether a calibration event exists, similar to block 106 above. In addition to the factors discussed above, a calibration event may exist when a cruise control system is activated. If a calibration event does not exist, then the method may continue at block 202. If a calibration event exists, then the method may continue at block 208.

At block 208, the vehicle 10 may be propelled at a predetermined speed profile. The predetermined speed profile may include propelling the vehicle 10 at a constant speed or may include decelerating the vehicle 10 at a predetermined rate. The closed loop speed control system may be used to propel the vehicle 10 at a constant speed, or to decelerate the vehicle 10 at a predetermined rate. In addition, a manual or non-closed loop speed control system may be used. For instance, a predefined calibration subroutine may be executed to provide instructions and/or feedback to a vehicle operator or technician. For example, the subroutine may instruct a technician to propel the vehicle at a particular predetermined speed or speed profile and may provide feedback as to whether the desired speed is obtained or maintained. Such instructions and/or feedback may be provided via the operator communication device 72.

At block 210, the foundation brakes 46 may be applied, similar to block 110 above. The foundation brakes 46 may be applied before, simultaneously with, or after initiation of the predetermined speed profile. A foundation brake 46 may be applied at a predetermined foundation brake pressure that may be low enough to be compensated for by the first and/or second power sources 20, 22 to maintain the predetermined speed profile. For example, energy provided by the first power source 20 and/or the second power source 22 to drive the electrical machine 24 may be used to at least partially offset brake force applied by the foundation brakes 46. As such, the method may be used to map or estimate foundation braking performance under conditions in which regenerative braking may be provided. The conditions in which regenerative braking may be provided may be based on the capacity or capability of the drivetrain 12. In addition, the method may be executed multiple times at different vehicle speeds while holding the foundation brake pressures constant. Alternatively the method may be executed multiple times at different predetermined foundation brake pressures while holding the vehicle speed constant or decelerating the vehicle 10 at a constant rate. For example, different predetermined brake pressures such as 5 psi, 10 psi, 15 psi, etc. may be used. Moreover, the predetermined brake pressures may be included as part of a predefined calibration subroutine that may provide instructions and/or feedback to a vehicle operator or technician. For example, the subroutine may instruct a technician to brake the vehicle at a predetermined brake pressure and may provide feedback as to whether the desired brake pressure is obtained or maintained. Such instructions and/or feedback may be provided via the operator communication device 72.

At block 212, data may be obtained or gathered similar to block 112 above. In addition, data from the regenerative braking system 42 may be obtained since the regenerative braking system 42 is not disabled. Such data may include monitoring the performance characteristics of the electrical machine 24, such as current flow, to determine or estimate the foundation brake torque that is being overcome or resisted by the electrical machine 24.

At block 214, the method may determine whether data gathering attributes or data gathering conditions are satisfactory, similar to block 114 above. If data gathering attributes are satisfactory, then the method may return to block 212 to continue to obtain data. If data gathering attributes are not satisfactory, then the method may continue at block 216.

At block 216, data may be processed similar to block 116 above.

At block 218, the processed data may be used to update stored parameters for use in future braking events similar to block 118 above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a brake system for a vehicle, the method comprising:
    temporarily disabling braking of the vehicle with a regenerative braking system;
    applying a foundation brake to provide a foundation brake torque;
    obtaining vehicle speed data, vehicle inclination data, and foundation brake pressure data while the foundation brake is applied; and
    determining a foundation brake torque profile that includes a set of vehicle speed values, a set of foundation brake pressure values, and a set of foundation brake torque values, wherein the set of foundation brake torque values is based at least in part on the set of vehicle speed values and the vehicle inclination data.

2. The method of claim 1 wherein braking of the vehicle with the regenerative braking system is temporarily disabled when a calibration event exists.

3. The method of claim 2 wherein braking of the vehicle with the regenerative braking system is temporarily disabled when a brake command is detected.

4. The method of claim 2 wherein braking of the vehicle with the regenerative braking system is temporarily disabled when vehicle speed data exceeds a threshold speed value.

5. The method of claim 2 wherein the calibration event exists when a different truck trailer is coupled to the vehicle.

6. The method of claim 2 wherein the calibration event exists when a change in vehicle weight is detected that exceeds a predetermined weight threshold value.

7. The method of claim 2 wherein the calibration event exists when a predetermined number of brake commands have occurred since a previous calibration event.

8. The method of claim 2 wherein the calibration event exists when maintenance is performed on the foundation brake.

9. The method of claim 1 wherein the step of obtaining data is terminated when the vehicle speed data is less than a threshold speed value.

10. The method of claim 1 wherein the step of obtaining data is terminated when data indicative of a brake pedal position changes at a predetermined rate.

11. A method of controlling a brake system for a vehicle, the method comprising:
    propelling the vehicle with a predetermined speed profile;
    applying a foundation brake to provide a foundation brake torque;
    providing torque with an electrical machine to maintain the predetermined speed profile;
    obtaining vehicle speed data, vehicle inclination data, electrical machine current data, and foundation brake pressure data while the foundation brake is applied; and
    determining a foundation brake torque profile that includes a set of vehicle speed values, a set of foundation brake pressure values, and a set of foundation brake torque values, wherein the set of foundation brake torque values is based at least in part on the set of vehicle speed values and the vehicle inclination data.

12. The method of claim 11 wherein the vehicle is propelled with the predetermined speed profile when the vehicle speed data exceeds a threshold speed value and wherein the step of obtaining data is terminated when the vehicle speed data is less than the threshold speed value.

13. The method of claim 11 wherein the vehicle is propelled with the predetermined speed profile when a calibration event exists.

14. The method of claim 13 wherein the calibration event exists when a cruise control system is activated.

15. The method of claim 11 wherein the predetermined speed profile includes propelling the vehicle at a constant speed.

16. The method of claim 11 wherein the predetermined speed profile includes decelerating the vehicle at a predetermined rate.

17. The method of claim 11 wherein the foundation brake torque is applied at a constant foundation brake pressure.

18. A method of controlling a brake system for a vehicle, the method comprising:
    determining whether a vehicle speed exceeds a threshold speed value;
    determining whether a calibration event exists;
    either temporarily disabling braking of the vehicle with a regenerative braking system or propelling the vehicle with a predetermined speed profile when the vehicle speed exceeds the threshold speed value and the calibration event exists;
    applying a foundation brake to provide a foundation brake torque;
    obtaining vehicle speed data, vehicle inclination data, and foundation brake pressure data; and
    determining a foundation brake torque profile that includes a set of vehicle speed values, a set of foundation brake pressure values, and a set of foundation brake torque values, wherein each member of the set of foundation brake pressure values and the set of foundation brake torque values is associated with a corresponding member of the set of vehicle speed values; and
    wherein the set of foundation brake torque values is based on the set of vehicle speed values, mass of the vehicle, and the vehicle inclination data.

19. The method of claim 18 wherein the step of determining the foundation brake torque profile includes filtering the vehicle speed data, vehicle inclination data, and foundation brake pressure data such that foundation brake pressure data gathered within a predetermined period of time after applying the foundation brake is omitted.

20. The method of claim 18 further comprising using the foundation brake torque profile to determine an amount of brake torque to apply with the regenerative braking system.

* * * * *